United States Patent Office 3,458,283
Patented July 29, 1969

3,458,283
HYDRAZINE PURIFICATION
Herman Paul Meissner, Winchester, and Raymond Frederich Baddour, Belmont, Mass., assignors to Abcor, Inc., Cambridge, Mass., a corporation of Massachusetts
No Drawing. Filed May 26, 1966, Ser. No. 553,013
Int. Cl. C01c 1/00
U.S. Cl. 23—190     5 Claims

ABSTRACT OF THE DISCLOSURE

Treating dilute aqueous solution of hydrazine or lower mono- or di-alkyl hydrazine by converting to hydrazinium salt by adding strong acid, contacting with cation exchange resin to adsorb hydrazinium ions, then eluting with strong base.

---

This invention relates to the purification and concentration of aqueous solutions of hydrazine and of certain alkyl hydrazines and pertains more specifically to the purification and concentration of Raschig liquor containing hydrazine.

The Raschig process as commonly used for preparing hydrazine produces an aqueous solution containing about 2% by weight of hydrazine and about 2% by weight of sodium chloride. In order to remove the large amount of excess water by conventional evaporating procedures requires a large quantity of heat which adds to the cost of the hydrazine. In addition, some of the hydrazine is decomposed by the high temperature required for evaporative concentration, and sodium chloride is not easily removed by an evaporative procedure.

One object of the present invention is to provide an inexpensive and effective process for the concentration of aqueous solutions of hydrazine and of certain lower alkyl hydrazines.

Another object is to provide a process for the purification and concentration of Raschig liquor containing hydrazine.

Other and further objects will be apparent from the description which follows.

It has been found that dilute aqueous solutions of hydrazine and of monoalkyl and dialkyl hydrazines in which each alkyl group contains 1 to 3 carbon atoms may be concentrated and/or purified by first acidifying the solution with an acid having a dissociation constant at least as great as $10^{-5}$ to convert the hydrazine or alkyl hydrazine to the corresponding water soluble hydrazinium salt of the acid. The solution is then brought into contact with a particulate or other form of cation exchange resin to adsorb the hydrazinium or alkyl hydrazinium ion from solution onto the resin, after which the hydrazine or alkyl hydrazine is eluted from the resin by bringing into contact with the resin an aqueous solution of a base having a dissociation constant of at least $10^{-5}$. The more concentrated the solution of base which is used, the higher the concentration of the hydrazine or alkyl hydrazine obtained. The amount of base employed, of course, should not appreciably exceed the amount equivalent to the amount of hydrazine or alkyl hydrazine to be eluted. If necessary, water may be used following the treatment of the resin with the aqueous solution of base in order to flush the hydrazine or alkyl hydrazine out of the resin bed, the flow of water being continued until all of the desired material has been removed. It is desirable to use the minimum amount of water necessary in order to avoid excessive dilution of the resulting solution of hydrazine or alkyl hydrazine.

The process of the present invention may be applied to hydrazine solutions and to monoalkyl and dialkyl hydrazines in which each alkyl group contains up to 3 carbon atoms, such as methyl hydrazine, ethyl hydrazine, n-propyl hydrazine, 1,1-dimethylhydrazine, 1,2-dimethyl hydrazine, 1,2-diethyl hydrazine and 1,2-di-n-propyl hydrazine. The process is particularly advantageous as pointed out above when applied to Raschig liquor containing hydrazine itself. However, dilute or concentrated aqueous solutions of the hydrazine or alkyl hydrazine may be purified by the invention, even though no increase in concentration occurs, and dilute solutions may be concentrated even though no impurities are removed.

While strong organic acids such as acetic, chloroacetic, trichloroacetic, lactic, and similar acids may be employed in the process provided they have a dissociation constant at least as great as $10^{-5}$, it is usually preferred to use strong mineral acids such as hydrochloric, nitric, hydriodic, sulfuric or the like. Of these, sulfuric acid is preferred because of its low cost; however, hydrazine sulfate in which one mole of acid is combined with one mole of hydrazine has only limited solubility in water, and so it is preferred to use only enough acid to form dihydrazine sulfate, which contains 2 moles of hydrazine combined with each mole of sulfuric acid, a salt which has much higher solubility in water.

Any conventional cationic exchange resin may be used in the process of the present invention, including both sulfonic acid and carboxylic acid resins. Among suitable cation exchange resins are sulfonated phenolic resins, carboxylated phenolic resins, sulfonated polystyrene, and sulfonated styrene copolymers. While the hydrogen form of cation exchange resin may be used, it is preferred, when purifying Raschig liquor or any other aqueous solution containing sodium salt as impurity, to employ the sodium form of the resin. In this manner none of the capacity of the resin is used up in adsorbing sodium ions, all of the adsorptive capacity of the resin being available for adsorption of the hydrazine. The resin may be in particulate form and may then be supported as a bed in the usual manner for passage of the solution through it. When the hydrogen form of resin is used, the effluent contains the acid originally added to the solution, together with hydrochloric acid derived from any sodium chloride present in the original solution. When the sodium form of resin is used, the effluent contains the sodium salt of the acid originally added, together with any sodium chloride originally present, which passes through unchanged.

The base which is used in aqueous solution for eluting the hydrazine or alkyl hydrazine from the resin may be any strong base having a dissociation constant at least as great as $10^{-5}$. Inorganic bases are preferred because of their low cost; among suitable bases are calcium hydroxide, which must be used in the form of a slurry because of its low solubility in water, and alkali metal hydroxides such as sodium or potassium hydroxide. Sodium hydroxide is preferred because of its low cost and high solubility. While the concentration of the solution of base may vary over a wide range and the solution may be very dilute in those cases where it is not desired to increase the concentration of the hydrazine or alkyl hydrazine in solution but only to separate impurities therefrom, it is usually desired to employ an aqueous base solution which is more concentrated than the original solution of hydrazine or alkyl hydrazine in order to end up with a more concentrated solution of the desired product. In the case of alkali metal hydroxides it is usually desirable to employ a solution containing at least 40% by weight of hydroxide, preferably a saturated solution, while, as indicated above, in the case of calcium hydroxide it is desirable to employ a slurry. It can be calculated that by using a 50% sodium hydroxide solution, it is possible to obtain as product a solution containing about 55% hydrazine hydrate. The adsorption and elution may be carried out at room temperature or at any convenient higher or lower temperature. There is ordinarily no advantage in employing reduced temperatures, but when it is desired to obtain the maximum possible concentration of the hydrazine or alkyl hydrazine in the solution which is produced, it may be advantageous to employ elevated temperatures, up to about 100° C., provided such elevated temperature has no deleterious effect upon the resin, because of the increased solubility of alkali metal hydroxides at elevated temperatures and the consequent possibility of using more concentrated aqueous solutions for the elution step.

Since the small amount of water present in the concentrated aqueous solution of base is normally insufficient to wash all of the liberated hydrazine or alkyl hydrazine from the bed of exchange resin, it is usually necessary in practice to follow treatment of the bed with the aqueous solution of base by a treatment with water in order to flush the hydrazine or alkyl hydrazine from the bed of resin particles. In order to obtain maximum concentration of the finished solution, it is important to use the minimum possible amount of water for this step.

The advantage of using an elevated temperature for the elution step, because of the higher concentrations which it is possible to achieve in this manner, is offset to some extent by the tendency of the hydrazine or alkyl hydrazine to decompose at elevated temperatures, so that in general it is preferred to carry out the process at approximately room temperature, i.e. at ambient temperature.

The following specific example is intended to illustrate more clearly the nature of the present invention without serving as a limitation upon the scope of the patent.

Example

There was added to 200 ml. of aqueous solution containing 2% by weight of hydrazine hydrate and 2.34% by weight of sodium chloride sufficient 2.5 normal hydrochloric acid to lower the pH to a value of 4–5, thereby forming hydrazinium chloride. This solution was then permitted to flow by gravity at room temperature through a bed containing 42.2 grams of a polystyrene sulfonate cation exchange resin in the hydrogen form having a particle size to pass a 100 mesh screen (Dowex 50W), the bed of resin particles being maintained in a 50 ml. glass burette by means of a suitable porous support. If desired, any solution remaining in the bed may be removed by a water wash.

Thereafter there was passed through the bed of resin 4.4 ml. of a 50% aqueous (saturated) sodium hydroxide solution. This was followed by distilled water in an amount sufficient to remove all of the hydrazine hydrate, both this step and the preceding one being carried out at room temperature. The effluent solution contained 8.1% hydrazine hydrate and represented a 98.5% recovery of the hydrazine hydrate introduced into the bed. The finished solution was substantially free from sodium chloride.

The resin was readily regenerated to the hydrogen form by passing through it 200 ml. of a 2.5 normal hydrochloric acid solution followed by washing with water to remove excess acid, whereupon the resin bed was ready for another operation. If the resin is to be used in the sodium form, no regeneration is necessary.

Similar results are obtained with solutions of lower monoalkyl and dialkyl hydrazines and with other acids and alkalis as pointed out above.

Although specific embodiments of the invention have been described herein, it is not intended to limit the invention solely thereto but to include all of the variations and modifications which suggest themselves to those skilled in the art.

What is claimed is:

1. A method of treating a dilute aqueous solution of a member of the class consisting of hydrazine and monoalkyl- and dialkyl-hydrazines in which each alkyl group contains from one to three carbon atoms which comprises adding to the solution an acid having a dissociation constant at least as great as $10^{-5}$ to convert said member to a soluble hydrazinium salt of said acid, bringing the solution into contact with a cation exchange resin to adsorb hydrazinium ions from said salt solution on said resin, then bringing into contact with said resin an aqueous medium containing an alkaline material having a dissociation constant at least as great as $10^{-5}$ to elute said member from said resin.

2. A method of purifying and concentrating Raschig liquor containing hydrazine which comprises adding to said liquor a mineral acid having a dissociation constant at least as great as $10^{-5}$ to convert the hydrazine to a hydrazinium salt of said acid, bringing the liquor into contact with a particulate cation exchange resin to adsorb hydrazinium ions on said resin, and eluting hydrazine from said resin with an aqueous sodium hydroxide solution.

3. A method as claimed in claim 2 in which the acid is sulfuric and sufficient acid is used to form dihydrazine sulfate and the sodium hydroxide solution contains at least 40% by weight of sodium hydroxide.

4. A method as claimed in claim 3 in which the resin is initially in the sodium form.

5. A method as claimed in claim 4 in which the solution of sodium hydroxide is saturated.

References Cited

UNITED STATES PATENTS 3,332,739   7/1967   Needham et al. _____ 23—190

OSCAR R. VERTIZ, Primary Examiner

HOKE S. MILLER, Assistant Examiner